(12) United States Patent
Braghiroli et al.

(10) Patent No.: US 8,671,734 B2
(45) Date of Patent: Mar. 18, 2014

(54) APPARATUS FOR MEASURING UNBALANCE FORCES

(75) Inventors: Francesco Braghiroli, Reggio Emilia (IT); Marco Tralli, Modena (IT); Lillo Gucciardino, Bomporto (IT); Salvatore Caramazza, Favara (IT)

(73) Assignee: Snap-On Equipment SRL a Unico Socio, Corregio (RE) (IT)

( * ) Notice: Subject to any disclaimer, the term of this patent is extended or adjusted under 35 U.S.C. 154(b) by 675 days.

(21) Appl. No.: 12/633,534

(22) Filed: Dec. 8, 2009

(65) Prior Publication Data
US 2010/0139397 A1 Jun. 10, 2010

(30) Foreign Application Priority Data

Dec. 10, 2008 (EP) ..................................... 08021452

(51) Int. Cl.
*G01M 1/22* (2006.01)
(52) U.S. Cl.
USPC .................................. 73/1.84; 73/462; 73/475
(58) Field of Classification Search
USPC ........................... 73/462, 471, 475, 1.14, 1.84
See application file for complete search history.

(56) References Cited

U.S. PATENT DOCUMENTS

| 3,675,495 | A | | 7/1972 | MacMillan |
| 4,776,215 | A | * | 10/1988 | Curchod .......................... 73/462 |
| 4,905,515 | A | * | 3/1990 | Himmler .......................... 73/471 |
| 5,544,073 | A | * | 8/1996 | Piety et al. ..................... 700/279 |
| 5,659,136 | A | * | 8/1997 | Koch et al. ....................... 73/462 |
| 6,430,992 | B1 | | 8/2002 | Goebel |
| 6,834,559 | B1 | | 12/2004 | Beebe |

FOREIGN PATENT DOCUMENTS

| EP | 1 108 204 B1 | 6/2001 |
| EP | 1 473 555 A | 11/2004 |
| WO | WO 97/28431 | 8/1997 |

* cited by examiner

*Primary Examiner* — John Chapman, Jr.
(74) *Attorney, Agent, or Firm* — McDermott Will & Emery LLP

(57) ABSTRACT

An apparatus for measuring forces produced by an unbalance of a rotary member 8 includes a support device 3 for supporting the rotary member 8 rotatably about its axis 1, and having at least one measurement sensor 4 placed at a vibratory location of the support device 3, wherein the at least one measurement sensor 4 is designed to measure vibratory accelerations of the location at which the measurement sensor 4 is placed.

4 Claims, 1 Drawing Sheet

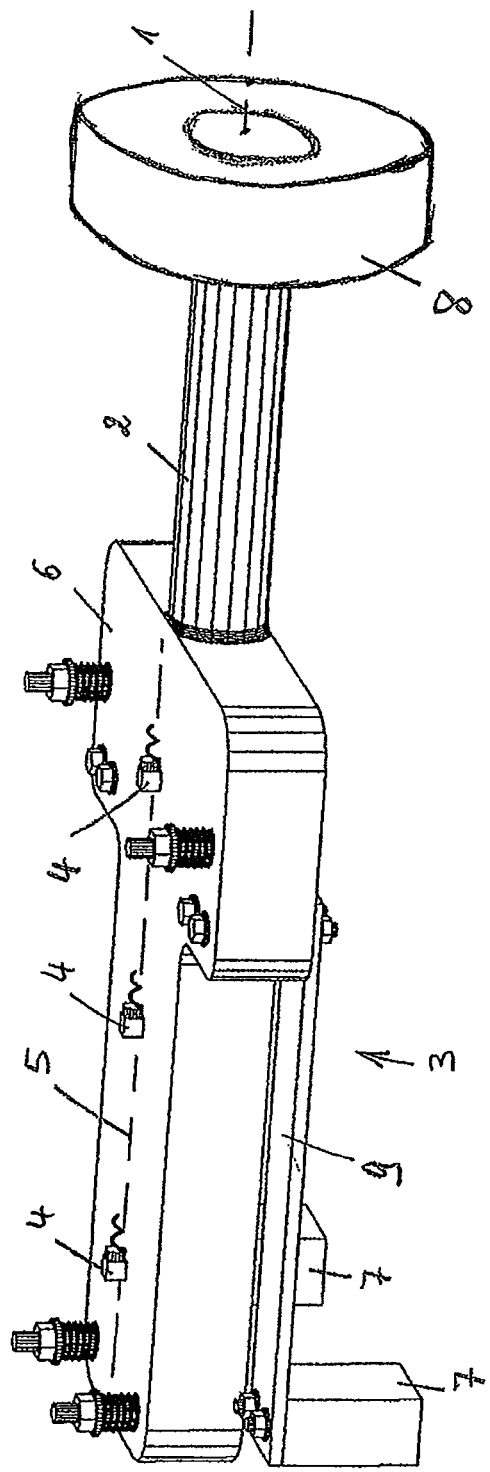

APPARATUS FOR MEASURING UNBALANCE FORCES

The invention concerns an apparatus for measuring forces which are produced by an unbalance of a rotary member, comprising support means for supporting the rotary member rotatably about its axis and having at least two measurement sensors placed at vibratory locations of the support means, wherein the at least two measurement sensors are designed to measure vibratory accelerations of the locations at which the measurement sensors are placed.

Such an apparatus is known from EP 1 108 204 B1 and comprises support means for supporting the rotary member rotatably about its axis and has at least one measurement sensor placed at a vibratory location of the support means.

The known measurement sensors are designed as force transducers, particularly piezo transducers which have to be mounted in pre-stressed condition.

An object of the invention is to provide an apparatus of the kind set forth in the opening part of this specification, in which an easy installation of the measurement sensor can be achieved.

The object is solved by an apparatus for measuring forces which are produced by an unbalance of a rotary member (8), comprising support means (3) for supporting the rotary member (8) rotatably about its axis (1) and having at least two measurement sensors (4) placed at vibratory locations of the support means (3), wherein the at least two measurement sensors (4) are designed to measure vibratory accelerations of the locations at which the measurement sensors (4) are placed, wherein a rotary mounting is configured to support a shaft rotatably about its axis and the shaft is adapted for fixing the rotary member on it, wherein the rotary mounting is guided for a vibratory movement particularly with respect to the axis of the shaft of the rotary member, on a station or a frame, and wherein two or more measurement sensors measuring vibratory accelerations are placed on the rotary mounting with axial distances in the axial direction of the rotary member.

The invention provides for measuring the forces which are produced by an unbalance of the rotary member at least one measurement sensor which is designed to measure vibratory accelerations of the location at which the measurement sensor is placed.

Particularly, the measurement sensor can be designed as accelerometer, specially a micromachined accelerometer.

Such accelerometers are surface-micromachined integrated-circuit accelerometers and consists of two surface micromachined capacitive sensing cells and a signal conditioning component contained in a single integrated circuit package. The signal conditioning component extracts the acceleration data from the difference between the two capacitors. The signal provides a high level output voltage that is proportional to acceleration.

Such accelerometers are available on the market, for example Freescale MMA6270.

The accelerometers are very compact, robust and can measure in up to three axis in a single package. Since the accelerometers are placed such that they do not support the rotary member or a shaft on which the rotary member is fixed, more than two accelerometers can be applied to the vibratory member. By reading and conditioning the measured signals of the more than two placed accelerometers, measurement errors can be reduced by applying suitable algorithms, for example least square algorithm. It would be possible to apply accelerometers in different, critical positions, continuously monitor the output of the accelerometers and perform an early detection of failures in the vibratory system, by measuring unexpected peaks in the output. Especially bearing failures can be found out thereby.

The accelerometers do not need to be pre-stressed in order to provide a signal. Thus, the accelerometers are arranged on the vibratory locations of the support means in non-stressed conditions. They are available with digital output and voltage output, both are easy to be managed. Since the accelerometers will not constitute cantilever supports, there is potentially no limitations to the number of accelerometers that can be installed in the vibratory system of the support means. In fact, even though a minimum of two accelerometers in different positions is required, increasing the number of accelerometers will not lead to a hyperstatic system and by reading all the available accelerometers and applying suitable algorithms —least square, for example —the measurement error can be reduced. Furthermore, reliability will be improved in this case since there is a redundant number of sensors. In case of failure of one or more accelerometers, the measurement will still be possible, as long as at least two of them are still working.

Errors can be further reduced by comparing the vibrations detected in the measuring system with the vibrations of other parts of the unit, thus eliminating or reducing the effects of unwanted, spurious vibrations. Furthermore, continuously monitoring the output of the different accelerometers can allow to perform an early detection of failures in the vibratory system. For example unexpected peaks in the output can indicate bearings failures.

It is possible to install accelerometers on a wheel balancer or on a tyre changer. By continuously monitoring the output of the accelerometers, an early detection of failures in the system, for example in the gearbox and/or other components can be achieved. It is also possible to measure wheel imbalance on the tyre changer, by measuring the periodic vibrations of the main shaft on which the vehicle wheel is supported for rotation. In this case, an incremental encoder to detect the angular position of the wheel during rotation is installed in the unit.

The invention will be described in greater detail hereinafter by means of an embodiment illustrated in the FIGURE.

The Figure shows a diagrammatic view of a rotary member 8 which for unbalance measurement is fixed and centered to a measuring shaft 2 in known manner by clamping means (not shown). The measuring shaft 2 is supported rotatably at a stationary frame 7. This can involve the machine frame of a wheel balancing machine or of a tyre changer. Support is afforded by means of a support means 3 which will be described in greater detail hereinafter and which also has measurement sensors 4. The support means 3 can have a tubular rotary mounting 6 in which the measuring shaft 2 is rotatably supported about its axis 1. The rotary mounting 6 which receives the measuring shaft 2 is supported by way of support levers which form a pair of support levers and a parallel guidance 9 on the stationary frame 7. The extension of the support levers is parallel to the axis 1 of the shaft 2. The guidance 9 allows vibratory movements of the shaft 2 and of the rotary mounting 6 perpendicular to the axis 1. Measurement sensors 4 are placed at vibratory locations of the support means 3. The measurement sensors 4 are designed to measure vibratory accelerations of the locations at which they are placed. In the illustrated embodiment, the measurement sensors 4 are located on the surface of the rotary mounting 6. Two or more measurement sensors 4 are placed on the rotary mounting 6. Especially, more than two measurement sensors 4 are provided. The measurement sensors 4 are placed with axial distances in the axial direction of the rotary member 8 or of the shaft 2. Preferably, the measurement sensors 4 are placed along a line 5 which is parallel to the axis 1 of the shaft 2 or of the rotary member 8.

Additional measurement sensors can be placed in critical positions of the supporting means 3 for failure detection on components of the vibratory system of the shown apparatus. The measurement sensors 4 are designed preferably as accelerometers, especially micro-machined accelerometers (MEMS). The measurement sensors 4 are placed in a non-stressed condition on the surface of the rotary mounting 6 and can be attached with glue or a simple screw or other appropriate fixing elements.

FEATURE LIST 1) axis
2) shaft
3) support means
4) measurement sensor
5) line
6) rotary mounting
7) stationary frame
8) rotary member
9) parallel guidance

The invention claimed is:

1. Apparatus for measuring forces which are produced by an unbalance of a rotary member, comprising support means for supporting the rotary member rotatably about its axis and having at least two measurement sensors placed at a vibratory location of the support means,
   - wherein the at least two measurement sensors are designed to measure vibratory accelerations of the locations at which the measurement sensors are placed,
   - wherein the support means comprises a shaft for fixedly supporting the rotary member, a rotary mounting for rotatably supporting the shaft about the axis, and a stationary frame for supporting the rotary mounting and guiding the rotary mounting for a vibratory movement perpendicularly with respect to the axis,
   - wherein the at least two measurement sensors are disposed on the rotary mounting at axial distances in the axial direction of the rotary member, and
   - wherein the apparatus further comprises at least one accelerometer placed in a critical position for performing an early detection of failures in the vibratory system of the apparatus by measuring unexpected vibratory peaks.

2. Apparatus according to claim 1, characterized in that the measurement sensors are placed along a line on the support means.

3. Apparatus according to claim 1 or 2,
   characterized in that the at least two measurement sensors are placed in a non-stressed condition on the support means.

4. Apparatus according to claim 1 or 2, characterized in that the support means are designed to be a component of a wheel balancer or of a tyre changer.

* * * * *